(12) United States Patent
Braun et al.

(10) Patent No.: US 6,846,127 B1
(45) Date of Patent: Jan. 25, 2005

(54) GRYOSCOPE CONTROLLED WALK BEHIND TROWEL

(75) Inventors: Michael Braun, Oconomowoc, WI (US); Michael Jenkins, Slinger, WI (US); Gregory Kruepke, Waukesha, WI (US)

(73) Assignee: Wacker Corporation, Menomonee Falls, WI (US)

( * ) Notice: Subject to any disclaimer, the term of this patent is extended or adjusted under 35 U.S.C. 154(b) by 0 days.

(21) Appl. No.: 10/703,236

(22) Filed: Nov. 7, 2003

(51) Int. Cl.[7] .............................................. E01C 19/22
(52) U.S. Cl. ...................................................... 404/112
(58) Field of Search ............................... 404/112, 114, 404/118

(56) References Cited

U.S. PATENT DOCUMENTS 4,232,980 A * 11/1980 Tertinek et al. ............. 404/112
5,584,598 A * 12/1996 Watanabe et al. ........... 404/112
6,758,631 B2 * 7/2004 Frankeny, II ............... 404/118

* cited by examiner

Primary Examiner—Gary S. Hartmann
(74) Attorney, Agent, or Firm—Boyle Fredrickson Newholm Stein & Gratz S.C.

(57) ABSTRACT

A control module for a walk behind trowel configured to detect and to prevent an uncontrolled or undesirable motion of the trowel. The trowel includes an engine configured to drive rotation of a rotor. The control module includes a gyroscope and a controller. The gyroscope is configured to provide an electrical signal representative of an angular rate of motion of a reference structure on the walk behind trowel. The controller is configured to receive the electrical signal from the gyroscope and to determine when a change in the angular rate of motion of the trowel exceeds a threshold value, and in response, to prevent the engine from driving the rotor to rotate.

12 Claims, 7 Drawing Sheets

GRYOSCOPE CONTROLLED WALK BEHIND TROWEL

BACKGROUND OF THE INVENTION

1 Field of the Invention

The invention relates to a control module, and, more particularly, relates to a control module having a gyroscope configured to prevent uncontrolled motion of a walk behind trowel.

2. Discussion of the Related Art

Walk behind trowels are generally known in the finishing of concrete surfaces. In particular, a walk behind trowel includes a rotor formed from a plurality of trowel blades that rest on the ground. The rotor is driven by a motor to provide a smooth, finished surface on the poured concrete. The motor is mounted on the frame or "cage" that overlies the rotor. The trowel is controlled by an operator via a handle extending several feet from the cage. Engine speed is controlled by a throttle located on the handle.

The walk behind trowel has several drawbacks. For instance, the rotating blades impose substantial backdrive torque on the cage that is normally counteracted by the grip of the operator to the handle of the trowel. This need for manual control presents a challenge during operation of the walk behind trowel. If the operator releases the handle, the torque can cause the trowel to spin undesirably.

Attempts to use a mechanical or electrical accelerometer to detect undesired or uncontrolled rotation of the trowel have been inadequate. Mechanical accelerometers did not react rapidly to an out of control spin. Electrical accelerometers did not provide assured sensitivity to an out of control spin. Specifically, the electrical accelerometers were too sensitive to noise levels associated with normal operation of the walk behind trowels to be effective, and typically shut down the engine prematurely.

In light of the foregoing, a walk behind trowel is desired that reacts rapidly and assuredly to prevent uncontrolled rotation of the trowel without excessive sensitivity to normal operational noise levels of the trowel.

OBJECTS AND SUMMARY OF THE INVENTION

The present invention provides an improved walk behind trowel for finishing concrete. The improved walk behind trowel includes a control module having a gyroscope configured to detect an undesirable or uncontrolled spin of the towel with enhanced sensitivity and responsiveness.

In accordance with a first aspect of the invention, one or more of the above-identified needs is met by providing a control module for a walk behind trowel powered by an engine that is operable to drive a rotor to rotate. The control module includes a gyroscope and a controller. The gyroscope is operable to provide an electrical signal representative of an angular rate of motion of a reference structure on the walk behind trowel. The controller is configured to receive the electrical signal from the gyroscope and to determine when a change in the angular rate of motion exceeds a threshold value, and in response, to prevent the engine from driving the rotor to rotate.

In accordance with a second aspect of the invention, the walk behind trowel includes a frame having a reference structure, a rotor positioned underneath the frame, an engine configured to drive rotation of the rotor, and a control module. The control module has a gyroscope and a controller. The gyroscope is operable to provide an electrical signal representative of an angular rate of motion of the reference structure on the frame. The controller is configured to receive the electrical signal from the gyroscope and to determine when a change in the angular rate of motion exceeds a threshold value, and in response, to shutdown the engine.

The resulting control module of the present invention has several advantages over devices in other machinery. The control module does not interfere with or hinder normal operation of the walk behind trowel. Further, the control module provides a more rapid and assured response to an uncontrolled or undesirable spin of the trowel.

The benefits provided by the control module are particularly (but by no means exclusively) applicable to walk behind trowels. Hence, in accordance with other aspects of the invention, a control module configured at least generally as described above and a walk behind trowel equipped with such a control module are additionally provided.

Other objects, features, and advantages of the invention will become apparent to those skilled in the art from the following detailed description and accompanying drawings. It should be understood, however, that the detailed description and specific examples, while indicating the preferred embodiments of the present invention, are given by way of illustration and not of limitation. Many changes and modifications may be made within the scope of the present invention without departing from the spirit thereof, and the invention includes all such modifications.

BRIEF DESCRIPTION OF THE DRAWINGS

Preferred exemplary embodiments of the invention are illustrated in the accompanying drawings in which like reference numerals represent like parts throughout, and in which.

DETAILED DESCRIPTION OF THE PREFERRED EMBODIMENTS

A wide variety of control modules for miscellaneous equipment could be constructed in accordance with the invention as defined by the claims. Hence, while preferred embodiments of the invention will now be described with reference to a walk behind trowel, it should be understood that the invention is in no way so limited. For instance, it is also usable with a variety of a variety of different machines that are potentially subject to undesired motion (e.g., augers, etc.).

Figure 1:
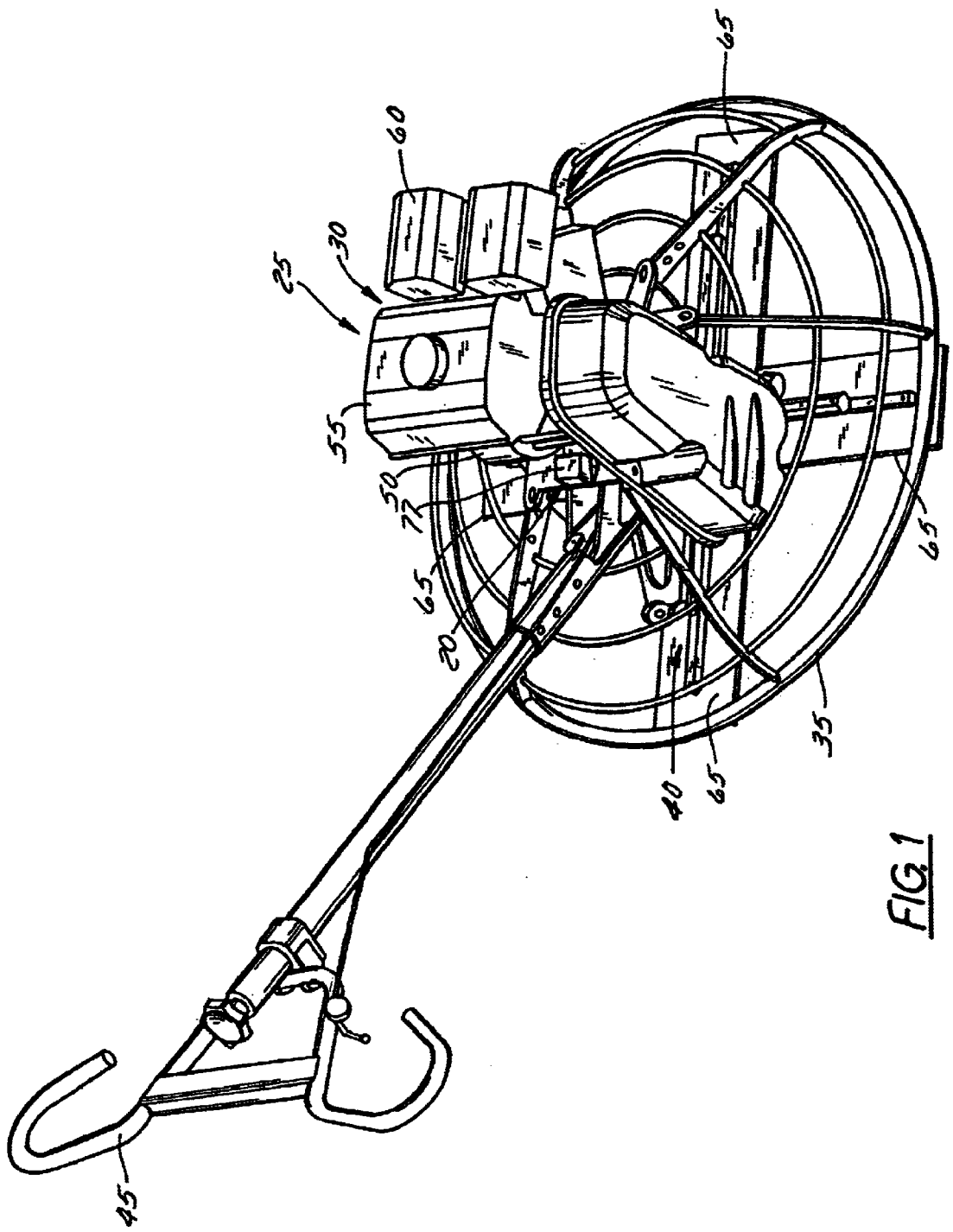
FIG. 1 is perspective view of a walk behind trowel and attached control module in accordance with the present invention.

Referring to FIG. 1 is a perspective view of a control module 20 in accordance with one embodiment of the invention connected to a walk behind trowel 25. In general, the walk behind trowel 25 includes an engine 30 mounted on a frame or "cage" 35 overlying a rotor 40. The trowel 25 is controlled by an operator via a handle 45 extending several feet from the cage 35.

The engine 30 is an internal combustion engine of the type generally used for a walk behind trowel 25. The engine 30 generally includes a crank case 50, a fuel tank 55, an air supply system 60, an output shaft (not shown), etc. The engine 30 further includes an ignition system to spark the internal combustion engine. One embodiment of the ignition system is a magneto ignition (not shown). The magneto ignition includes a magnet that rotates with the engine output shaft and generates a magnetic flux change in the magneto ignition with every cycle to power an ignition coil (not shown). The ignition coil provides an electrical output that is sufficiently strong to power a spark plug.

Figure 2:
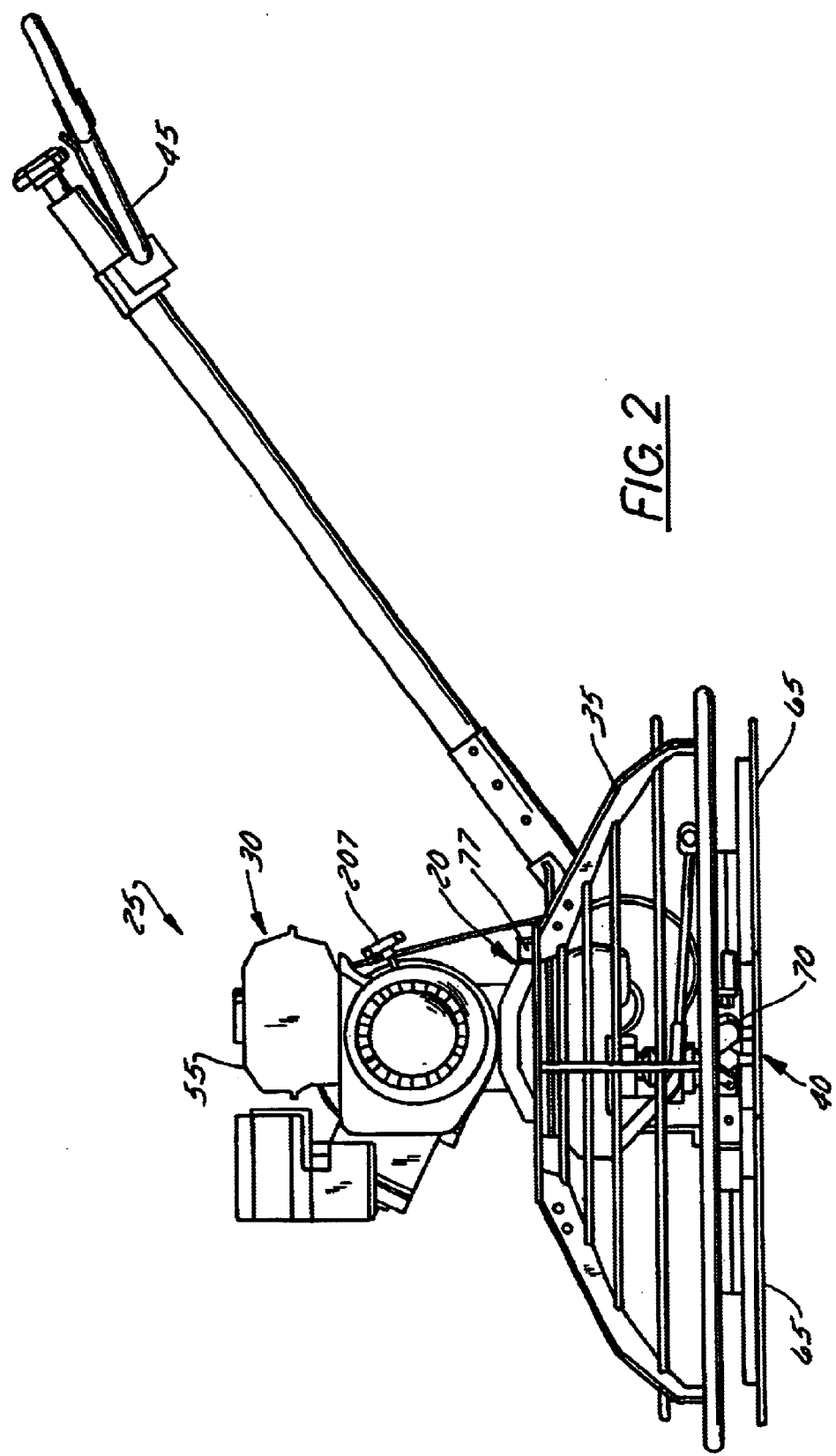
FIG. 2 is a side elevation view of the walk behind trowel shown in FIG. 1.

Referring to FIG. 2, the rotor 40 includes a plurality of trowel blades 65 extending radially from a hub 70 which, in turn, is driven by a vertical shaft (not shown). The shaft of this embodiment comprises a gearbox output shaft. Alternatively, the shaft could be coupled to the gearbox output shaft either directly or via an interfering torque transfer arrangement. At a designated clutch speed, the engine output shaft drives rotation of the rotor 40 and attached trowel blades 65. The rotating trowel blades 65 are configured to provide a smooth, finished surface on a poured concrete.

Pursuant to a preferred embodiment of the invention, the control module 20 is generally configured to shutdown the engine upon detecting an uncontrolled or undesirable spin of the walk behind trowel. The control module is enclosed in a housing 77 (FIGS. 1 and 2) mounted to the trowel 25. The position of the control module 20 and housing 77 can vary. In the illustrated embodiment, it is mounted on the frame specifically, on the engine support plate.

a. Circuit Diagrams

Figure 3:
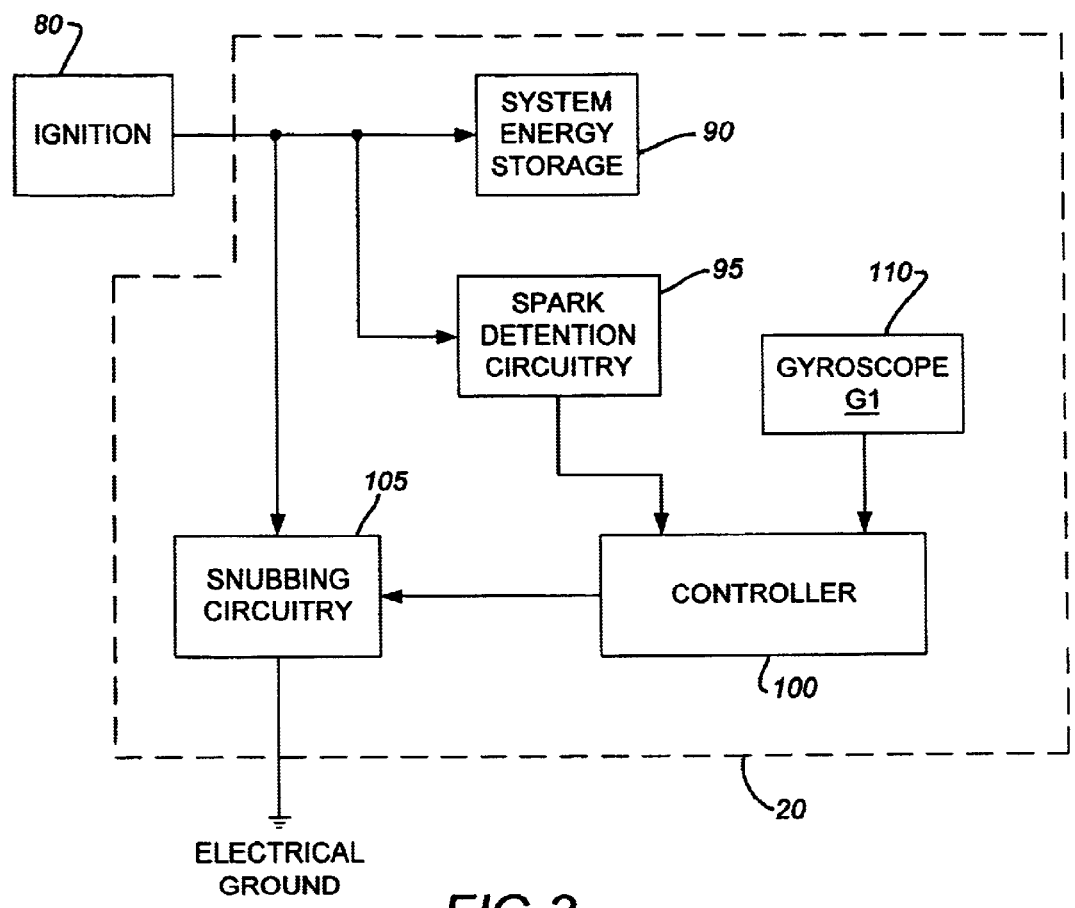
FIG. 3 is a schematic diagram of a control module embodying the present invention.
Figure 4A:
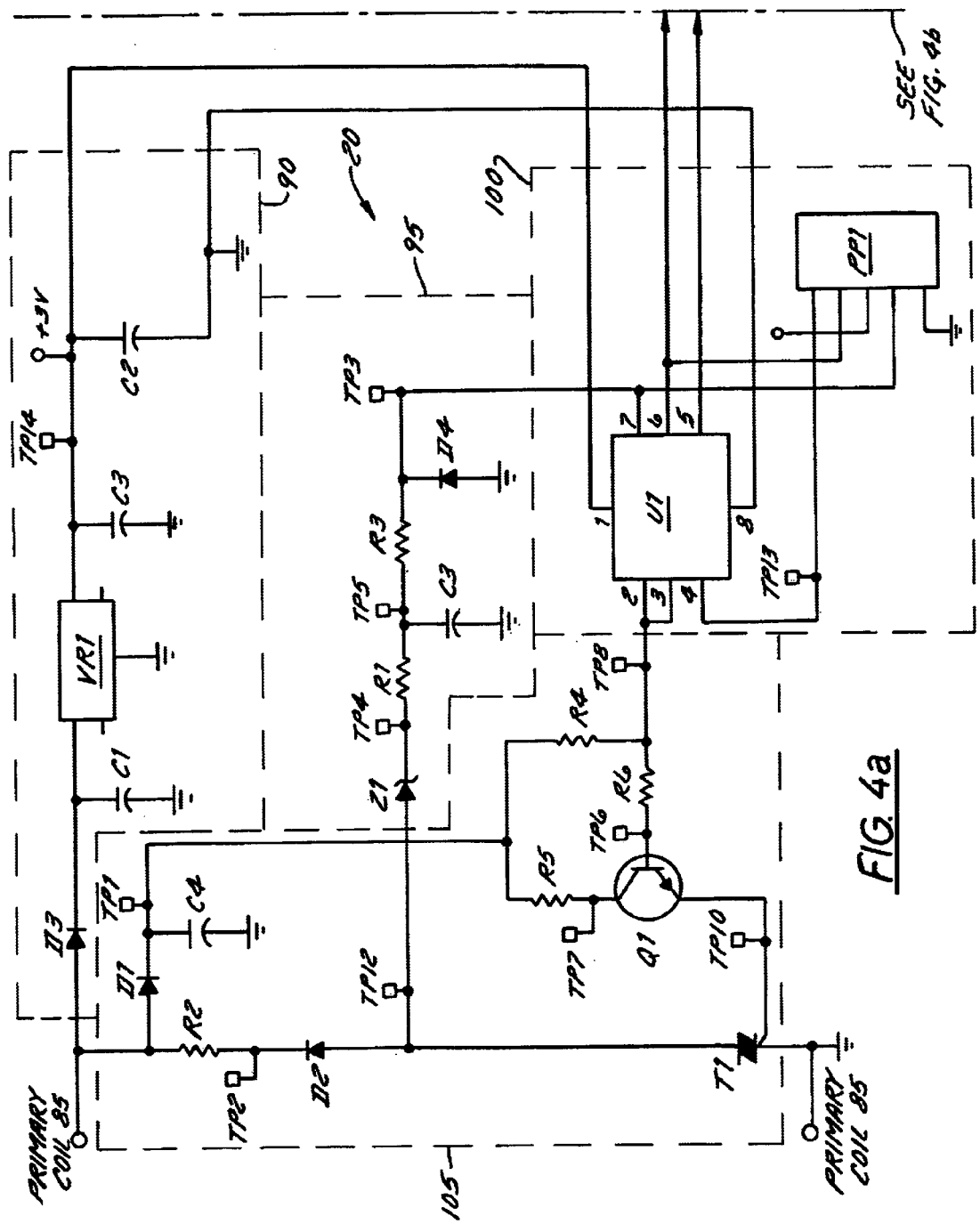
FIG. 4a and FIG. 4b are circuit diagrams of the control module of FIG. 1.
Figure 4B:
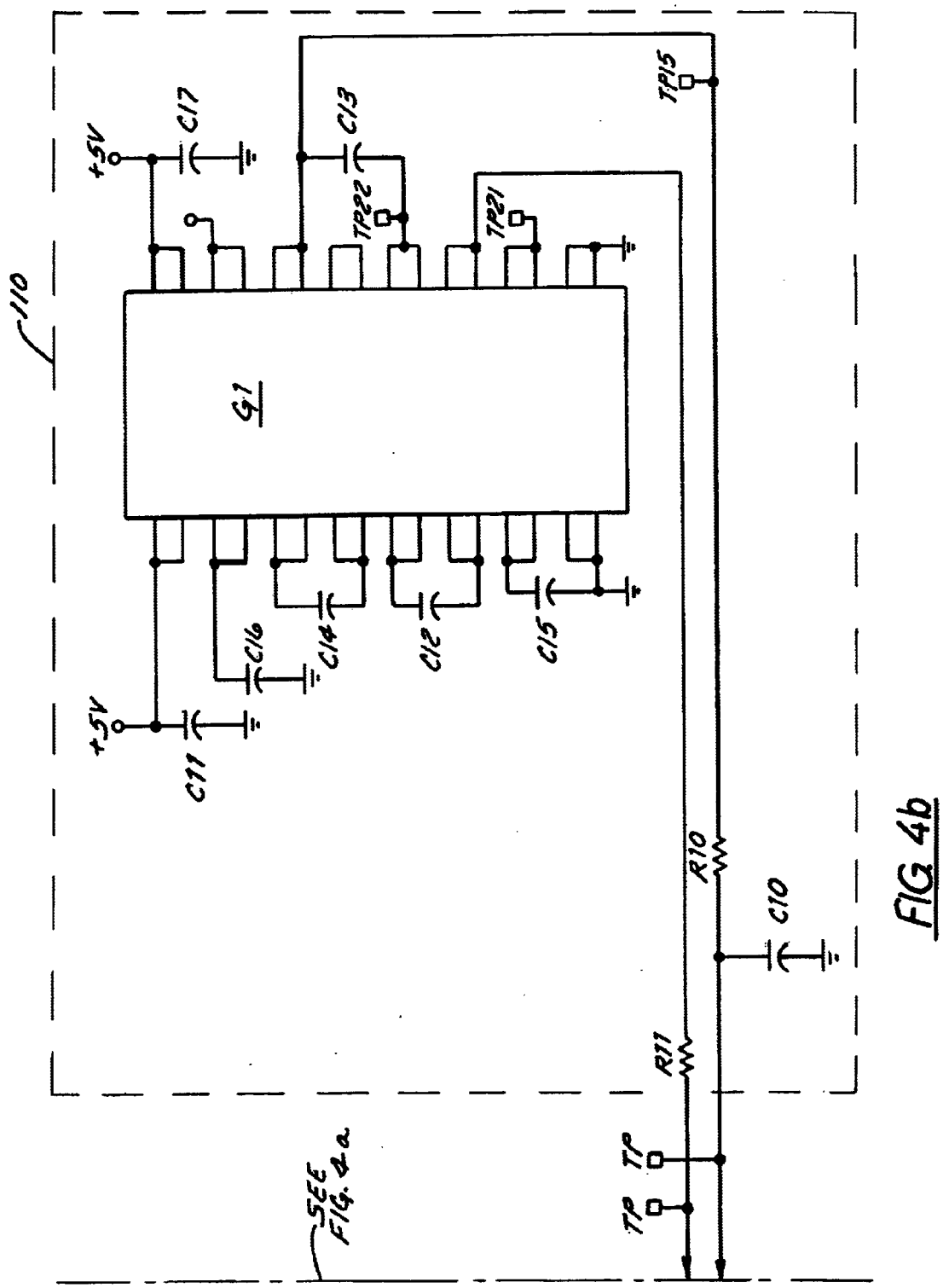
Figure 5:
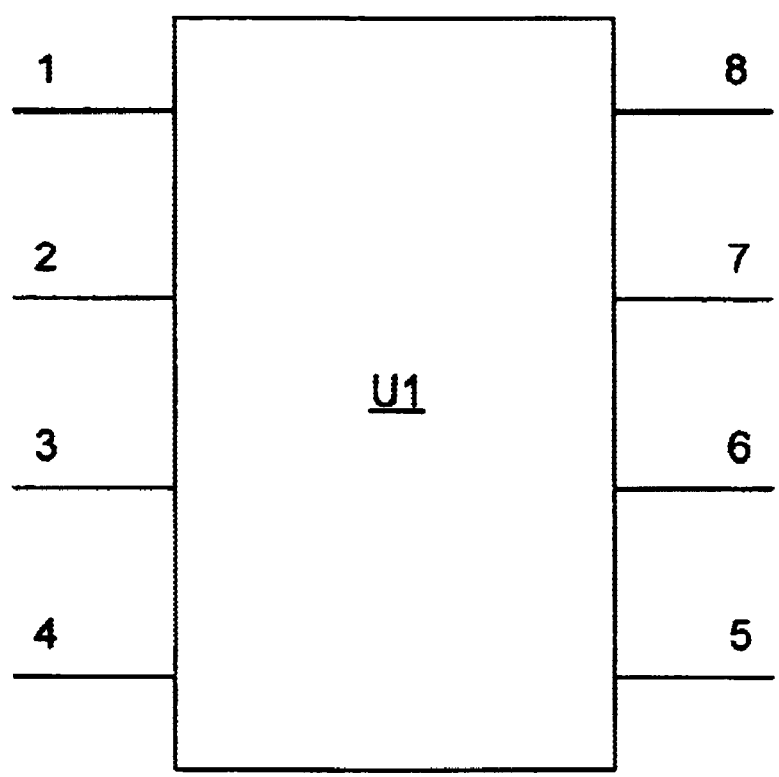
FIG. 5 is a schematic diagram of the pin connections of the controller U1 in FIG. 4.

FIGS. 3 and 4 show the detailed embodiment of the control module 20 of the presently preferred embodiment of the invention. The following sections describe the functions of the individual circuit blocks shown in FIG. 3. Each circuit block represents a circuit function. Refer to the circuit diagram in FIG. 4 for information on the circuit block locations and interconnectivity. FIG. 5 illustrates the pin locations of the microcontroller U1 shown in FIG. 4.

The control module 20 is electrically connected to and receives electrical power from the electrical pulses or signals transmitted from the ignition system 80 to the engine 30. The control module 20 of this embodiment is electrically connected in parallel with a primary ignition coil 85 (FIG. 4) of the ignition system 80 to the engine 30. The primary ignition coil 85 receives an alternating current (AC) having a frequency of electrical pulses of about 100V amplitude to spark the engine 30. The frequency of electrical pulses to the primary ignition coil 85 is interrelated to the cycling of the engine 30. As described above, the cycling of the engine 30 drives the magneto ignition to generate the frequency of electrical pulses to power the primary ignition coil 85. The primary coil 85 is configured with a secondary coil (not shown) to provide the high voltage arc (e.g., 10,000 volts) across a spark plug for igniting combustion of fuel to the engine 30.

Referring to FIGS. 3 and 4, a system energy storage block 90 (diode D3, capacitors C1, C2, and C3, and linear voltage regulator VR1) generally provides a low voltage power supply to the control module 20 using the electrical pulses to the primary ignition coil 85. Capacitors C1 and C3, and linear voltage regulator VR1 provide protection for the microcontroller U1 from surges in the provided electrical power from the electrical pulses. Diode D3 prevents the electrical energy stored in the capacitor C1 from discharging to the primary ignition coil 85.

A spark detection or sensing circuit 95 (zener diode Z1, diode D4, capacitor C5, and resistors R1 and R3) senses and conditions the electrical pulses from the primary ignition coil, and transmits the sensed electrical pulse signals to a controller 100. Zener diode Z1 qualifies the electrical spark pulses or signals while resistor R1 and capacitor C5 filter the electrical signals, and resistor R3 and diode D4 limit the voltage of the electrical pulses for transmission to the data input pin P7 of the microcontroller U1 (See FIG. 5).

A snubbing circuit 105 (resistors R2, R4, R5, R6, transistor Q1, diodes D1 and D2, capacitor C4, and triac T1) is configured to electrically snub (i.e., shunts to an electrical ground) the electrical pulses to the ignition coil unless commanded not to by the controller 100. Diode D1 prevents the energy built-up in capacitor C4 from discharging to the ignition coil circuit. As the transistor Q1 conducts, capacitor C4 and resistor R5 provide the necessary gate voltage and current to activate the triac T1. The activation of the triac T1 regulates the electrically snubbing of the electrical pulses transmitted to the primary ignition coil 85 for sparking the engine 30. The electrical snubbing of the electrical pulses stops ignition of the engine 30, and thereby prevents the engine 30 from driving the rotor 40 to rotate.

A gyroscope circuit 110 (Resistors R10 and R11, capacitors C10, C11, C12, C13, C14, C15, C16, C17, gyroscope G1 is operable to detect a change in angular rotation of a reference point on the frame 35 during operation of the walk behind trowel 25. A preferred embodiment of the gyroscope G1 is a Model No. ADXRS 150ABG, manufactured by ANALOG DEVICES, INC™. The gyroscope G1 is configured to generate a voltage signal representative of a change in angular motion or an angular rate of motion of the trowel and provide the voltage signal to the controller. In one embodiment, the gyroscope G1 generates an electrical signal based on a 0 to 5 V reference. The electrical signal includes 255 intermediate steps (i.e., 19.061 mV/step). Each 19.061 mV step represents a nominal angular rate of motion of about 1.57 degrees/second, or 12.5 mV nominal per degree/per second. The type of gyroscope circuit 110, gyroscope G1, respective discrete components, and respective electrical signal output can vary.

The controller 100 is a programmable, integrated component that generally consolidates and controls many of the functions of the control module 20. The functions provided by the controller 100 include: (1) monitoring a change in angular rotation of the frame of the trowel 25; (2) comparing the change in angular rate of motion to a designated range; and (3) preventing the engine output from driving the rotor 40 to rotate if the angular rate of motion of the trowel 25 is outside of the designated range. If the angular rate of motion is outside of the designated range, the controller 100 activates the snubbing circuit to electrically snub the electrical pulses to the primary ignition coil 85. Thereby, the controller 100 prevents the engine from driving the rotor to rotate.

In FIG. 4, the controller 100 includes the microcontroller U1 electrically connected to receive electrical pulse signals from the detection circuit block 95 and electrically connected to regulate operation of the snubbing circuit 105. The microcontroller U1 is also electrically connected to a programming port PP1 for programming the microcontroller U1 with software instructions to perform many of the functions of the control module 20. A preferred embodiment of the microcontroller U1 is a Model No. PIC12 F675, manufactured by MICROCHIP TECHNOLOGY, INC™. Other microcontrollers can be used alone or in combination with discrete electrical components and/or circuits to perform the functions of microcontroller U1. The microcontroller U1 may also be entirely replace by such other discrete components and/or circuits.

The control module 20 and gyroscope G1 are positioned at a reference point on the trowel frame 35 of the walk behind trowel 25. The position of the reference point can vary. The gyroscope G1 provides a signal representative of the angular rotation of the reference point on the trowel frame 35 to the controller 100. If the controller 100 detects that the operating state of the trowel 25 is outside a designated range, the controller 100 prevents the engine 30 from driving rotation of the rotor 40. The controller 100 determines the operating state based on the signal from the gyroscope G1 representative of the angular motion rate of the trowel 25. If the operating state, (e.g., sensed angular rotation) exceeds a designated range, the controller 100 ceases to disable transistor Q, thereby allowing transistor Q1 to provide an electrical output from capacitor C4 to activate the triac T1. The active triac T1 electrically snubs the electrical pulses to the ignition coil of the engine 30, thereby shutting operation of the engine 30 and preventing the engine 30 from driving the rotor 40 to rotate.

b. Circuit operation

Figure 6:
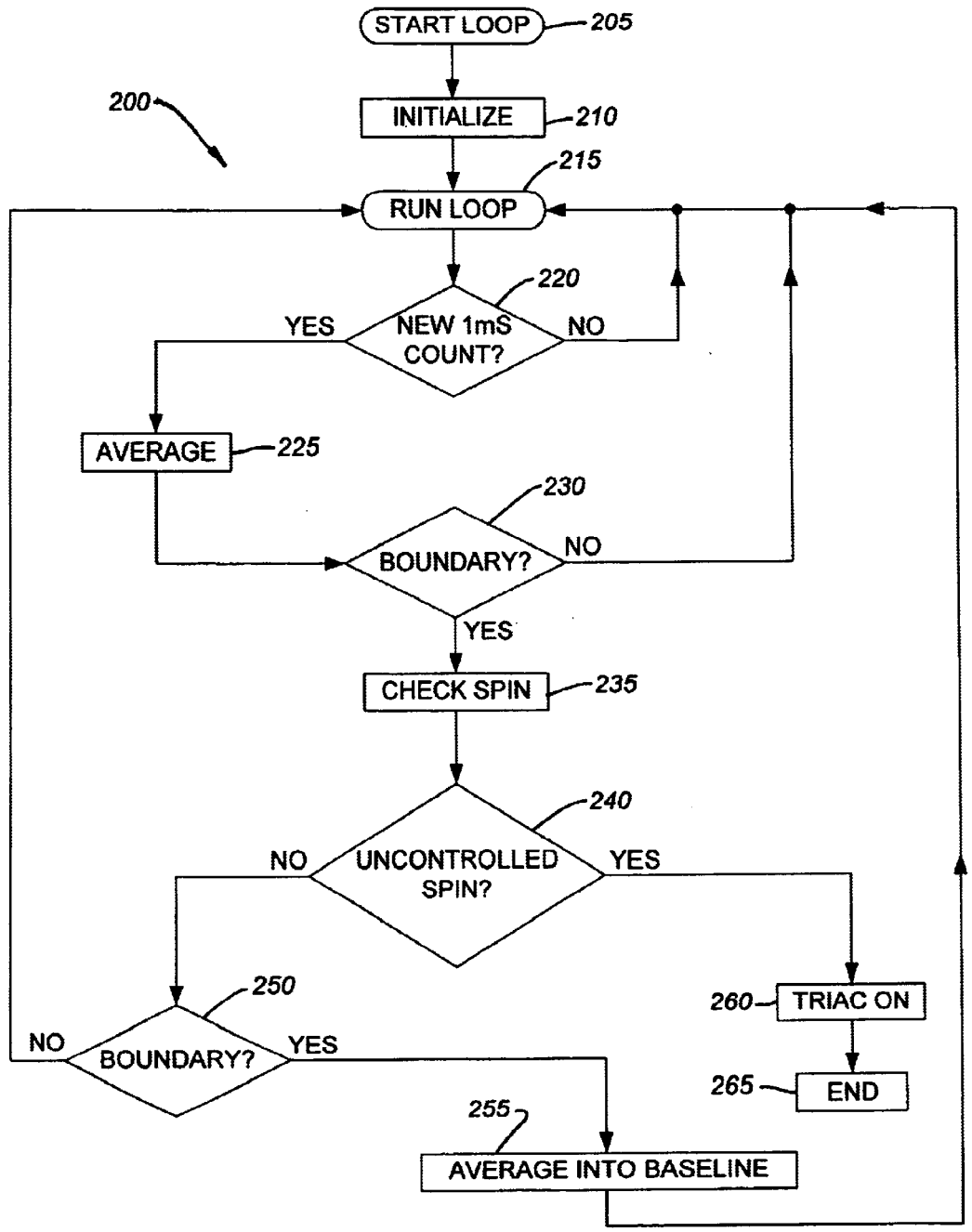
FIG. 6 is a flow diagram of a first embodiment of a method of preventing uncontrolled rotation during operation of a walk behind trowel din accordance with the present invention.

Having described the basic architecture of the control module 20 of the present invention, a method 200 of operation of the control module 20 will now be described as shown in FIG. 6. It is envisioned that the method 200 of operation can be modified for other embodiments of the control module 20. Furthermore, it is envisioned that not all the acts may be required, that some of the acts may be modified, or that the order of the acts may vary.

As shown in FIG. 6, the method 200 proceeds from START at act 205. An operator pulls a manual starter cord 207 to start the engine 30. The initial startup of the walk behind trowel 25 rotates the magnet of the magneto ignition, providing power to the ignition coil to power the control module 20.

After the initial startup of the engine 30, the method 200 initializes at act 210. The act 210 of initializing requires a minimum time period (e.g., one second) of idling operation of the engine 30. The minimum idling time period can vary. During this idling time, the controller 100 determines the time period between successive electrical signals or pulses created by the magneto ignition which is translated into an idling speed of the engine 30. The controller 100 also acquires a signal from the gyroscope circuit 110 every 1 milliseconds (mS) for the next 20 mS, or a group of 20 readings. The power provided to the control module 20 by the electrical pulses determines a number of readings received by the controller 100. As an example, for an idling speed of about 1200 rpm, the controller 100 could acquire about 10 groups of 20 readings, or 200 total readings, over the idling time period. If the idling speed is between 1116 and 1616 rpm, then the controller could acquire about 20 readings every 37.1 to 53.8 mS, ultimately acquiring 18 to 27 groups of 20 ADC readings, or 360 to 540 total readings. The idle speed and required idling time can vary.

At act 210 of the method 200, the controller 100 determines a baseline value (detailed below) of the angular motion rate of the gyroscope G1 and trowel 25 to be used in determining an uncontrolled or undesirable trowel 25 spin event. Alternatively, the controller 100 could use a predetermined baseline value.

As described above, the designated range is preferably up to a designated threshold value. One embodiment of the designated threshold value is a difference between an average or baseline value and a running average value of angular motion rate of the trowel 25. The baseline value is either predetermined or determined over an extended operating period of the trowel 25. The running average value is determined over a plurality of time intervals comprising the operating period of the trowel 25. If controller 100 detects the difference exceeds the designated threshold value, the controller 100 snubs the ignition system of the engine 30 to shutdown the trowel 25.

The controller 100 preferably adjusts the baseline value in determining an uncontrolled or undesirable trowel spin event. The controller 100 is programmed to adjust a preprogrammed baseline average of the angular motion rate of the trowel 25 using an increment/decrement/leave (IDL) technique. The IDL technique uses a IDL scale of 0 to 255, equal to the number of stepped voltages of the signal generated by the currently preferred gyroscope G1 of circuit 110. The controller 100 initializes at a predetermined baseline value of 128, which is half way along the scale of 0 to 255. If the controller 100 detects an electrical signal from the gyroscope circuit 110 at a higher voltage than the baseline value of 128 (i.e. 2.5 V), then the controller 100 increments the baseline value by one. Conversely, if the controller 100 detects an electrical signal from the gyroscope circuit 110 at a lower voltage than the baseline value, then the controller 100 decrements the baseline value by one. In one embodiment, the controller 100 preferably limits the actual IDL scale to 115 to 140 to reduce the scale to a more typical range of expected values. In another embodiment, the controller 100 uses a preprogrammed baseline value and a designated threshold difference for detecting an uncontrolled or undesirable trowel motion event. The technique to determine the baseline value can vary.

When the idling time period of the engine is satisfied and the controller 100 is initialized at act 210, the method 200 proceeds to act 215 and determining a running average of the signals from the gyroscope circuit 110. In determining the running average, the controller 100 iterates through a process loop in translating and averaging motion rate signals acquired from the gyroscope circuit 110. The initial value of the running average is preferably the baseline value initially determined during the idling time of the engine. Yet, the initial running average value can vary. The controller 100 receives a sensed angular motion rate signal from the gyroscope for each predetermined time interval (act 220) of e.g., about every 1.024 mS (±0.5 mS). At act 225, the controller averages the plurality of sensed values for angular motion represented by the signals from the gyroscope circuit 110 to determine the running average. The controller 100 can use the same IDL technique described above to adjust the running average. Thereby, the slew rate of the running average is 1/1.024 mS, which is 128 times faster than the slew rate of the baseline value. The technique to determine the running average can vary.

The method 200 proceeds to act 230, where the controller 100 determines whether a "boundary" or predetermined running average time period (e.g., 16.384 mS) has ended for determining the running average value.

The method 200 proceeds to act 230, where the controller 100 compares the difference between the running average and the baseline value. At act 235 of method 200, the controller 100 determines an indication of an out of control spin event based on the difference between the baseline value and the running average. The controller 100 determines an out of control spin event if the difference in angular motion rate is at or exceeds the designated threshold value, e.g., between about 60 and 110 degrees per second, and more preferably between 70 and 100 degrees per second.

In a preferred embodiment of act 235, the predetermined threshold difference ranges from 48 to 50 (Scale of 0 to 255), which represents a voltage drop of about 941 to 980 mV and a change in detected angular rate of motion of about 75.3 to 78.4 degrees/second. However, the predetermined threshold can vary. In determining this preferred value of threshold difference, empirical tests performed on the preferred embodiment of the walk behind trowel 25 indicate that the controller 100 can expect the voltage signal from the gyroscope circuit 110 to drop by about 375 mV/100 mS (±15 mV/100 mS) for an out of control or undesirable spin event. Under this scenario, the signal can drop 983 mV in 262 mS. During this uncontrolled event period, the controller 100 can average two signals received from the gyroscope circuit 110 into the baseline value, and two-hundred fifty-six signals received from the gyroscope circuit 110 into the running average. Thereby, the baseline value can change by a step value of two while the running average can change by a step value of about 50 (e.g., 983 mV/19.6 mV per step).

In another embodiment of the method 200, the controller 100 can create a histogram of signal readings from the gyroscope circuit 110. For example, the controller 100 can acquire a signal reading every 370 to 510 mS intervals (+10 mS) from the gyroscope. Of course, the length of the time interval between signals from the gyroscope circuit 110 can vary.

The method 200 proceeds to act 240. At act 240, the controller 100 determines whether an uncontrolled spin event has occurred. If an uncontrolled spin event did not occur, then the method 200 proceeds to act 250. At act 250, the controller 100 determines or detects whether a "boundary" or a predetermined time period has elapsed for averaging the running average value into the baseline value (act 250). If at the boundary, the controller 100 averages the running average value for the angular motion rate detected at the respective baseline value adjustment period into the baseline value (act 255). The baseline adjustment time period can vary. Then, the controller 100 returns to act 215. If not at the boundary, the controller 100 proceeds to act 215.

If, at act 240 of the method 200, the controller 100 detects that an uncontrolled spin event has occurred and there is a change in angular motion rate beyond the threshold difference, then the method 200 proceeds to act 260. Act 260 includes preventing the engine 30 from driving the rotor 40 to rotate. The controller 100 activates the triac T1 to electrically snub or ground the electrical signals from the magneto ignition to power the primary ignition coil 85. Electrically snubbing or grounding the electrical signals causes the engine 30 to shutdown, thereby preventing the engine 30 from driving the rotor 40 to rotate. Following act 260, the method 200 then proceeds to the END at act 265.

The control module 20 of the trowel 25 is operable to prevent the engine 30 from driving the rotor 40 to rotate within 300 degrees rotation relative to a trowel position at initiation of an uncontrolled spin event, hence assuredly preventing a spinning trowel 25 from impacting an operator. In doing so, controller 100 is operable to detect an indication of an uncontrolled spin event within 25 degrees rotation of the trowel position at initiation of the uncontrolled spin event. This response is considered adequate for operating trowel machinery.

However, in fact, empirical tests show that the control module 20 of the present invention is operable to react and to stop the trowel 25 within 270 degrees rotation relative to the trowel's position at initiation of the uncontrolled spin event (e.g., releasing the handle 45 and control of the trowel 25). In doing so, the controller 100 is operable to detect an uncontrolled spin event of the trowel 25 within at least 15 degrees rotation relative to the position of the trowel 25 at initiation of the uncontrolled spin event, using the threshold difference in angular rotation of at least about 100 degrees/second (±10 degrees/second). These results surpass the performance of known trowel machinery.

As indicated above, many changes and modifications may be made to the present invention without departing from the spirit thereof. The scope of some of these changes is discussed above. The scope of others will become apparent from the appended claims.

We claim:

1. A walk behind trowel, comprising:

(A) a frame having a reference structure;

(B) a rotor positioned underneath the frame;

(C) an engine configured to drive rotation of the rotor; and (D) a control module having:

a gyroscope operable to provide an electrical signal representative of an angular rate of motion of the reference structure on the frame; and a controller configured to receive the electrical signal from the gyroscope and to determine when a change in the angular rate of motion exceeds a threshold value, and in response to prevent the engine from driving the rotor to rotate.

2. The walk behind trowel of claim 1, wherein the controller is operable to shut down the engine to prevent rotation of the rotor.

3. The walk behind trowel of claim 1, wherein the engine includes an ignition coil configured to receive a plurality of electrical pulse to drive operation of the engine, and further comprising a switch connected electrically to an electrical ground and in parallel to the ignition coil of the walk behind trowel.

4. The walk behind trowel of claim 3, wherein the controller prevents rotation of the trowel blades by activating the switch and electrically snubbing the plurality of electrical pulses to the ignition coil to shutdown the engine.

5. The walk behind trowel of claim 4, wherein the controller is configured to electrically snub a portion of the electrical pulses to prevent the engine from driving rotation of the rotor.

6. The walk behind trowel of claim 1, wherein the electrical signal from the gyroscope is a variable voltage value representative for every degree of rotation/second.

7. The walk behind trowel of claim 6, wherein a reduction in the variable voltage value from the gyroscope represents an increase in the angular rate of motion of the frame of the walk behind trowel.

8. The walk behind trowel of claim 7, wherein the controller determines the threshold value of the angular rate of motion by averaging a running average of variable voltage values with a baseline value.

9. The walk behind trowel of claim 7, wherein the controller stores a histogram of variable voltage values generated by the gyroscope.

10. The walk behind trowel of claim 7, wherein the controller is configured to shutdown the engine upon detecting the angular rate of motion exceeding 70 degrees/second.

11. The walk behind trowel of claim 1, wherein the gyroscope is configured to be mounted on a handle connected to the frame of the walk behind trowel.

12. The walk behind trowel of claim 1, wherein the controller is configured to determine an operating state outside of the designated range within at least 15 degrees rotation of the trowel.

* * * * *